Jan. 4, 1938. F. WHITNEY 2,104,063
BIFOCAL SPECTACLE BRIDGE
Filed May 18, 1935
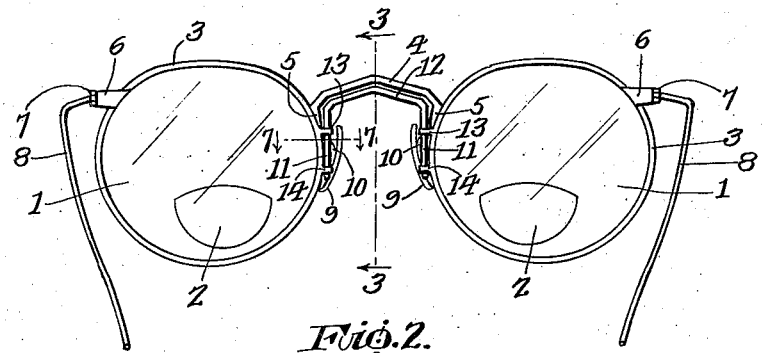
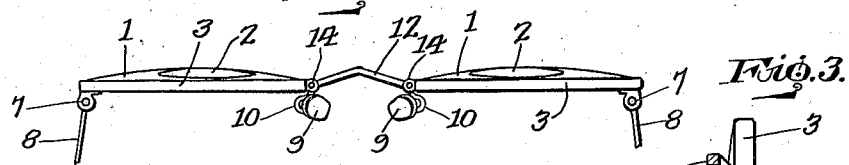
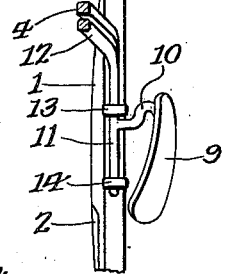
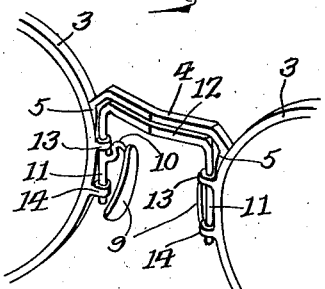
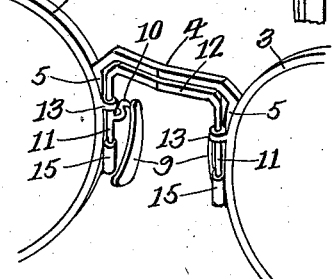
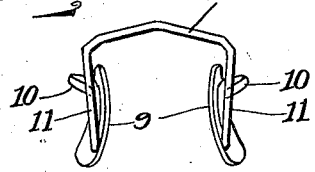
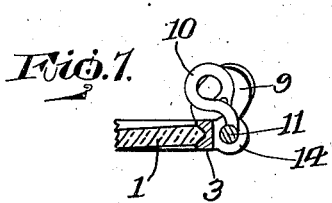
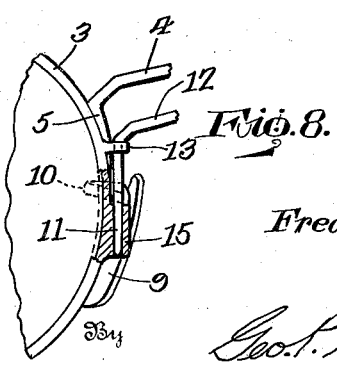
Inventor
Frederic Whitney
By Geo. S. Kimmel
Attorney Patented Jan. 4, 1938

2,104,063

UNITED STATES PATENT OFFICE 2,104,063

BIFOCAL SPECTACLE BRIDGE

Frederic Whitney, Los Angeles, Calif.

Application May 18, 1935, Serial No. 22,245

7 Claims. (Cl. 88—49)

This invention relates in general to spectacles, and more particularly to means for supporting the spectacles on the face of the wearer.

In the conventional bifocal lens, the reading field is ordinarily so placed and the lens so mounted that when the wearer is looking straight ahead his line of sight will pass through the distance field at a point above the reading or near vision field. In using the near vision field it is necessary for the wearer to incline his line of vision downwardly with respect to the normal straight ahead line of vision.

The above arrangement is not satisfactory under ordinary conditions, and when a person is required to view near objects directly in front of or on a level with his face, the necessary tilting of the head to enable the bifocal wearer to see through the near vision field is very unnatural, annoying and tiresome.

In the past, two principal means have been resorted to to overcome this difficulty. The first and most obvious is of course to employ two pairs of spectacles, one for near vision and one for distance. The other is to provide some means of support for the spectacles to support them in a raised position on the face and thus permit the straight ahead line of sight to pass through the near vision field at such times as desired.

However, the first mentioned means is naturally cumbersome and objectionable in that it necessitates the procuring and carrying of two pairs of spectacles. As for the second mentioned means for accomplishing the desired result, efforts to produce a practical structure have for the most part failed. Some have been difficult to move into and out of operative position. Others have necessitated the weakening of the spectacle frame construction, have proven too weak in themselves, or have been so positioned as to unduly strain the spectacle frame and cause its distortion.

It is therefore an object of this invention to eliminate the above and other defects and shortcomings of the prior art in providing near vision in a straight ahead direction.

Another object is to provide a simple, inexpensive and practical construction for supporting a pair of bifocal spectacles upon the face of a wearer in raised position whenever it is desired to use the near vision field for straight ahead vision.

Another object of this invention is to provide such a device which may be caused to positively support the spectacles in either raised or normal position at will without necessity for removing the spectacles from the face in making the change.

Another object is to provide such a device which has but one moving part, is simple and inexpensive to manufacture, is pleasing and inconspicuous in appearance, and which will remain in whatever position to which it may have been adjusted.

Still another object is to provide a device which will be strong and durable in itself, which will not necessitate weakening of the regular spectacle frame, and which will actually add strength to the same.

Other objects and advantages will become apparent from the following description of one illustrative embodiment of the invention taken in connection with the accompanying drawing, in which:—

Figure 1 is a front elevation of a pair of spectacles embodying the invention.

Figure 2 is a bottom plan view of the same.

Figure 3 is an enlarged sectional view taken along the line 3—3 of Figure 1.

Figure 4 is a view in enlarged perspective showing the central portion of the spectacle frame of Figure 1.

Figure 5 is a view similar to Figure 4 showing a slightly modified form.

Figure 6 is a view of the auxiliary bridge member employed in this invention, shown detached from the spectacle frame proper.

Figure 7 is an enlarged partial sectional view taken along the line 7—7 of Figure 1.

Figure 8 is an enlarged view of a portion of the modification shown in Figure 5, parts being broken away and shown in section to illustrate the details of construction.

Referring now more particularly to the drawing, the spectacles illustrated in Figures 1 and 2 are provided with a pair of bifocal lenses having distance fields 1 and near vision fields 2 respectively. These lenses are mounted within the lens rims 3 in the customary manner, these rims being connected by the usual relatively rigid bridge member 4, having its legs 5 soldered or otherwise rigidly secured to the respective rims. Suitable endpieces 6 are provided, secured to the rims adjacent their outer edges in any suitable manner, and these provide hinge joints 7 for mounting the forward ends of the temples 8 in a well known manner.

Nose pads or guards 9 and supporting arms 10 are provided as usual, for the purpose of supporting the spectacles upon the wearer's nose. These, however, are not mounted upon the ends of the bridge 4 or upon the rims 3 in the usual manner, but are provided with a special mounting for the purpose of carrying out the objects of this invention.

In the present invention, the pad or guard arms 10 are secured at their forward ends to the downwardly extending legs 11 of an auxiliary bridge 12. This auxiliary bridge itself is relatively stiff, but is formed of a material, which may possess some resilience and so shaped that, when not under tension, it assumes the contour shown in Figure 6, with its legs 11 converging slightly downwardly. The bridge 12 itself is shaped to conform to the contour of the bridge 4 and is adapted to be capable of lying close to the bridge 4 to render it inconspicuous and pleasing in appearance.

In the form shown in Figures 1 to 4 inclusive, the auxiliary bridge 12 is mounted on the rims 3 by means of upper and lower eyelets 13 and 14 arranged in substantially vertical alignment with each other and rigidly positioned on the rims. These eyelets are adapted to slidingly receive the legs 11 of the bridge 12 as shown, and are spaced apart by the distance which it is desired that the sliding bridge shall move. The upper eyelets 13 are so positioned that when the bridge 12 is moved upwardly until the guard arms 10 abut them, the upper portion of the bridge 12 will lie closely adjacent the bridge 4. When in this position the guards or nose pads 9 should be so positioned as to support the spectacles upon the face in the normal position for straight ahead distance vision. When the auxiliary bridge 12 is moved down to its other extreme position, with the arms 10 abutting the upper faces of the eyelets 14, the position of the pads 9 should be such as to support the spectacles in position for straight ahead near vision, that is, with the near vision fields 2 of the bifocal lenses directly before the pupils of the eyes. By virtue of the fact that the bridge 12 is made of spring material and is of slightly different shape when free than when mounted within the eyelets 13 and 14, it is apparent that it will bear against the inner walls of the eyelets and be frictionally held in whatever position it may occupy.

The modification illustrated in Figures 5 and 8 is like the form previously described with the exception that the lower eyelets are in the form of tubes 15, which are of such length that when the bridge 12 is in its lower position the lower ends of the legs 11 will not project from them. There is thus eliminated the possibility of these projecting ends catching upon any adjacent objects or scratching the wearer's flesh. Each eyelet is termed a combined coupling and guiding member.

In operation, the auxiliary bridge 12 may be moved up or down to desired position by any method desired, such as by grasping and moving it with the fingers. However, it is unnecessary to remove the mounting from the face, because by simply pressing the pads against the nose and pushing the rims 3 up or down, the position of the bridge 12 and the pads 9 with respect to the rims 3 may be easily adjusted as desired.

It is apparent that the mounting will possess all the strength of the conventional mounting, and that in addition it will derive strength from the auxiliary bridge, which will reinforce the regular or main bridge 4. The nose pads 9 will be at all times maintained in proper relationship with respect to each other, which relationship will not be altered by the adjustment of the height of the bridge 12. The parts are of simple and inexpensive construction, and there is only one moving part; thus reducing the number of wearing parts to a minimum. The device disclosed fully provides for the carrying out of the objects of the invention.

It will be appreciated that the foregoing description and the accompanying drawing are solely for the purpose of illustration and should not be construed as in any wise limiting the spirit or scope of this invention. It is to be limited only by the prior art and by the terms of the appended claims.

What I claim is:

1. In a spectacle, a pair of bifocal lenses, a bridge fixedly secured adjacent its ends to the nasal sides of said lenses, an auxiliary bridge having depending legs, superposed combined couplers and guideways on each nasal side of a lens adjacent each of the respective ends of said first mentioned bridge substantially encircling and slidably retaining the respective legs of said auxiliary bridge, relative to the nasal sides of the lenses, and nose pads mounted on said auxiliary bridge for sliding movement therewith.

2. In a spectacle mounting adapted to hold a pair of bifocal lenses, a substantially rigid bridge for joining said lenses, an auxiliary bridge having resilient depending leg portions disposed at an inclination with respect to each other when not under tension superposed vertically disposed combined couplers and guideways adapted to be carried by the nasal sides of the lenses adjacent and independent of each of the respective ends of said first mentioned bridge substantially encircling and slidably retaining the respective legs of said auxiliary bridge, and nose pads mounted on said auxiliary bridge for sliding movement therewith.

3. In a spectacle mounting adapted to hold a pair of bifocal lenses, a substantially rigid bridge for joining said lenses, an auxiliary bridge having depending leg portions disposed at an inclination with respect to each other when not under tension superposed vertically disposed combined couplers and guideways adapted to be carried by the nasal sides of the lenses adjacent and independent of each of the respective ends of said first mentioned bridge substantially encircling and slidably retaining the respective legs of said auxiliary bridge, and nose pads mounted on said auxiliary bridge for sliding movement therewith, said combined couplers and guideways including parts adapted to serve as stops for limiting sliding movement of said auxiliary bridge.

4. In a spectacle mounting adapted to hold a pair of bifocal lenses, a substantially rigid bridge for joining said lenses, an auxiliary bridge having resilient depending leg portions disposed at an inclination with respect to each other when not under tension, a pair of vertically aligned eyelets adapted to be connected to the nasal sides of said lenses adjacent each of the respective ends of said first mentioned bridge substantially encircling and slidably retaining the respective legs of said auxiliary bridge, and nose pads mounted on said auxiliary bridge for sliding movement therewith.

5. In a spectacle mounting adapted to hold a pair of lenses, a substantially rigid bridge for joining said lenses, an auxiliary bridge having resilient depending leg portions disposed at an inclination with respect to each other when not under tension, a pair of vertically aligned eyelets adjacent each of the respective ends of said first mentioned bridge substantially encircling and slidably retaining the respective legs of said auxiliary bridge, and nose pads mounted on said auxiliary bridge for sliding movement therewith, the eyelets of each pair being spaced apart by a distance equal to the distance which said auxiliary bridge is to be allowed to slide, and said nose pads being joined to the legs of said auxiliary bridge intermediate the eyelets of the respective pairs.

6. In a spectacle mounting adapted to hold a pair of lenses, a substantially rigid bridge for joining said lenses, an auxiliary bridge having resilient depending leg portions disposed at an inclination with respect to each other when not under tension, a pair of vertically aligned eyelets for connection to each side of a lens adjacent each of the respective ends of said first mentioned bridge substantially encircling and slidably retaining the respective legs of said auxiliary bridge, and nose pads mounted on said auxiliary bridge for sliding movement therewith, the lower of each of said pairs of eyelets being of elongated tube-like formation of sufficient length to conceal the lower ends of the legs of the auxiliary bridge both in the upper and lower extreme positions of adjustment thereof.

7. In a spectacle mounting adapted to hold a pair of bifocal lenses, a pair of lens rims, a substantially rigid high arch bridge joining said lens rims at the nasal sides thereof, an auxiliary high arch bridge of resilient material having depending legs disposed at an angle to each other when not under tension, a pair of vertically aligned eyelets on each of said rims adjacent the respective ends of said first mentioned bridge substantially encircling and slidably retaining the respective legs of said auxiliary bridge, and nose pads mounted on said auxiliary bridge for sliding movement therewith, the eyelets of each pair being spaced apart by a distance equal to the distance which said auxiliary bridge is to be allowed to slide, said nose pads being joined to the legs of said auxiliary bridge intermediate the eyelets of the respective pairs, and the upper portion of said auxiliary bridge being shaped to conform to the contour of said first mentioned bridge and adapted to lie closely adjacent thereto when in uppermost position.

FREDERIC WHITNEY.